United States Patent [19]

Freeman

[11] Patent Number: 4,939,359

[45] Date of Patent: Jul. 3, 1990

[54] INTRUSION DETECTION SYSTEM WITH ZONE LOCATION

[75] Inventor: Stanley B. Freeman, Jericho, N.Y.

[73] Assignee: Pittway Corporation, Syosset, N.Y.

[21] Appl. No.: 208,057

[22] Filed: Jun. 17, 1988

[51] Int. Cl.⁵ .............................................. G01V 9/04
[52] U.S. Cl. .................................... 250/221; 340/567
[58] Field of Search .................. 250/221, 221.1, 209, 250/203, 342, 334, 338.1, 340, 349, 353; 340/555, 567

[56] References Cited

U.S. PATENT DOCUMENTS

| | | | |
|---|---|---|---|
| 3,958,118 | 5/1976 | Schwarz | 250/221 |
| 3,988,726 | 10/1976 | Reiss et al. | 250/338.1 |
| 4,238,675 | 12/1980 | Turlej | 250/353 |
| 4,275,303 | 6/1981 | Mudge | 250/342 |
| 4,318,089 | 3/1982 | Frankel | 340/567 |
| 4,339,748 | 7/1982 | Guscott | 340/555 |
| 4,375,034 | 2/1983 | Guscott | 250/342 |
| 4,429,224 | 1/1984 | Wagli | 250/342 |
| 4,468,657 | 8/1984 | Rossin | 340/555 |
| 4,479,056 | 10/1984 | Zierhut | 250/342 |
| 4,514,630 | 4/1985 | Takahashi | 250/342 |
| 4,514,631 | 4/1985 | Guscott | 250/342 |
| 4,523,095 | 6/1985 | Keller-Steinbach | 250/349 |
| 4,612,442 | 9/1986 | Toshimichi | 250/353 |
| 4,642,454 | 2/1987 | Carlson | 250/221 |
| 4,644,164 | 2/1987 | Mudge | 250/353 |
| 4,645,930 | 2/1987 | Zierhut | 250/342 |
| 4,650,989 | 3/1987 | Frigon | 250/221 |
| 4,663,213 | 5/1987 | Bailey et al. | 428/204 |

OTHER PUBLICATIONS

Scotchlite Heating Product Bulletin 109-A (Jan. 1985), 4 pages.
Scotchlite Heating Product Bulletin 100-A (May 1986), 2 pages.
Scotchcal Film Product Bulletin 1-B (Oct. 1986), 3 pages.

Primary Examiner—David C. Nelms
Attorney, Agent, or Firm—Fish & Richardson

[57] ABSTRACT

An intrusion detection system includes housing structure with a radiation entrance aperture, a sensor responsive to infrared radiation mounted in the housing structure. Optical system structure in the housing structure receives infrared radiation through the radiation entrance aperture from a monitoring zone and focuses the received infrared radiation onto the sensor, and means in the housing structure connected to the sensor provides an output signal in response to movement of an infrared radiating object in the monitored zone. Reflector structure of the diffuse (non-optical) type is adapted to be located in a first position immediately in front of the sensor and reflects visible radiation from a source of visible radiation located in a monitored zone and directed in a beam at the sensor back through the optical system to a monitored zone provided by the optical system structure.

20 Claims, 3 Drawing Sheets

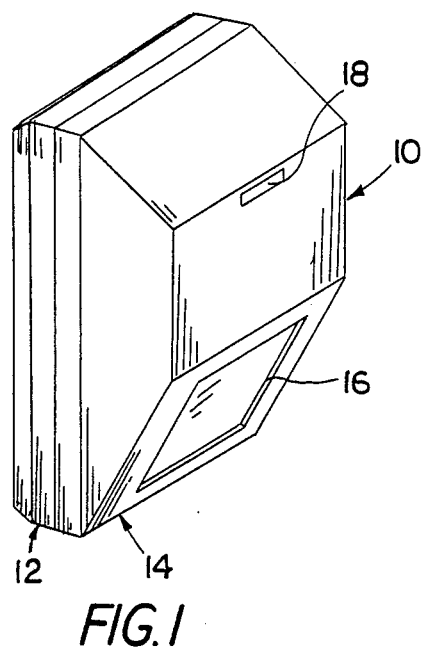
FIG.1
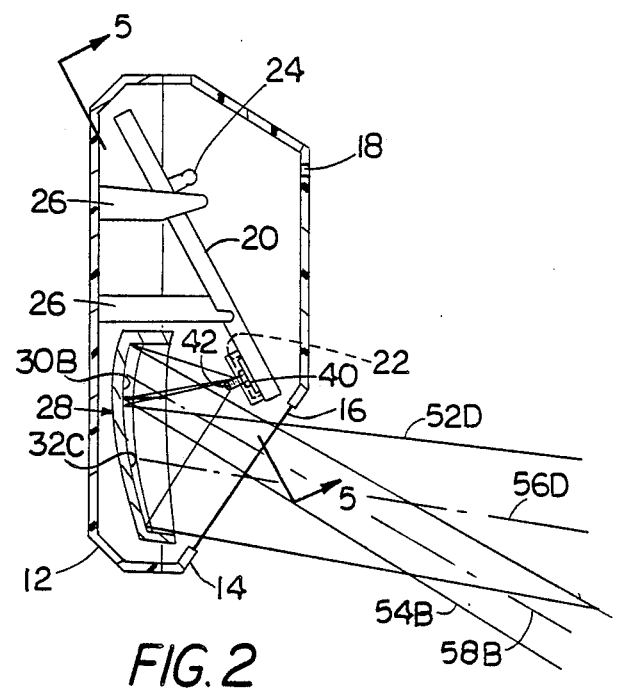
FIG.2
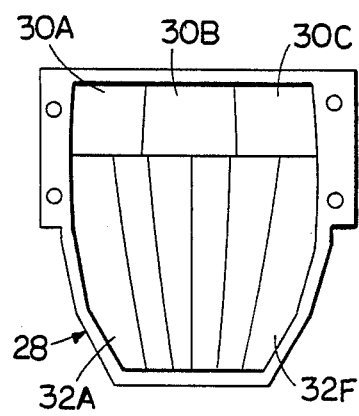
FIG.3
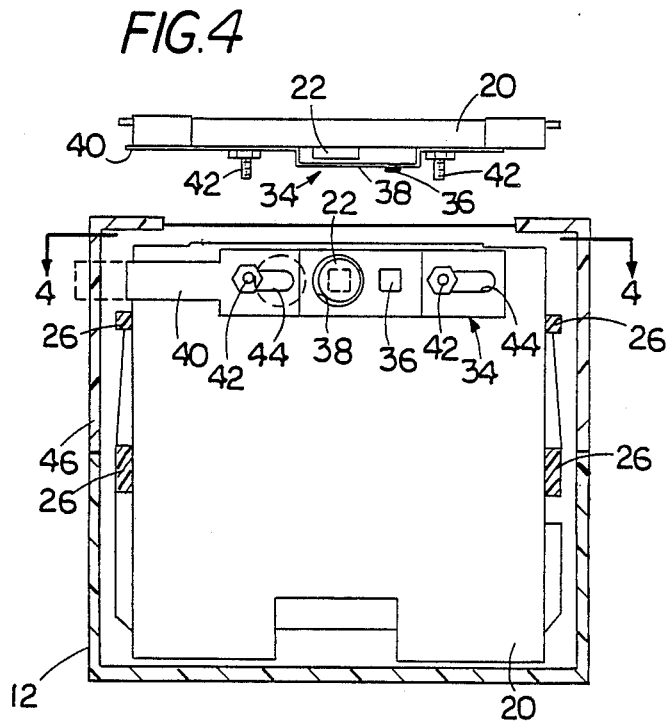
FIG.4
FIG.5

INTRUSION DETECTION SYSTEM WITH ZONE LOCATION

This invention relates to security systems, and more particularly to security systems that employ intrusion detection systems of the passive infrared type and the like.

In intrusion detection systems of the passive infrared type, infrared energy radiated by the body of an intruder is sensed. Typically, in such intrusion detection systems, a detection unit includes a multifacet mirror structure for focusing infrared energy from a plurality of monitoring zones onto a sensor unit, for example of the pyroelectric type, the presence of an intruder being detected by the change in infrared energy sensed by the sensor unit as the intruder moves through the monitoring zones.

As an intruder enters a monitoring zone, the resulting change in infrared energy is sensed by the sensor unit and an alarm condition is created. It is desirable that the intrusion detection unit be mounted such that the likely direction of intruder motion is across the monitoring zone. Also, the detection unit should not be located in areas which contain objects likely to produce a rapid change in temperature or where the monitoring zones have obstructions which may block the pattern of coverage. As the monitoring zones are not delineated in visible manner, it is difficult for a person installing or adjusting the detection unit to determine the location of each monitoring zone. Accordingly, such zones are most commonly determined by "walk testing"—a testing process in which the installer walks through the area in which the detection system is installed and identifies the location of a monitoring zone when his present presence activates the system alarm. Such "walk testing" is not only a time consuming procedure, but it is also difficult to determine the precise boundaries of each monitoring zone. As alternatives, it has been proposed to provide a light source near the sensing element to aid in locating monitoring zones, light from the source being reflected through a multifacet optical system so that the installer standing in a projection zone can better determine the boundaries of that zone. However, it is difficult to usefully locate the light source adjacent the sensing element as the multifacet optical system of the detection unit typically focuses radiation from the monitoring zones on a sensor that has a sensitive area of less than one square centimeter. It has also been proposed to position a small optical mirror near the sensor so that an installer looking at the optical mirror would actually see the several fields of view simultaneously.

In accordance with the invention, there is provided an intrusion detection system that includes housing structure with a radiation entrance aperture, a sensor responsive to infrared radiation mounted in the housing structure, optical system structure in the housing structure for receiving infrared radiation through the radiation entrance aperture from a monitoring zone and focusing the received infrared radiation onto the sensor, and means in the housing structure connected to the sensor for providing an output signal in response to movement of an infrared radiating object in the monitored zone. Reflector structure of the diffuse (non-optical mirror) type, such as wide angle or retroreflective sheeting, is adapted to be located in a first position immediately in front of the sensor for reflecting visible radiation from a source of visible radiation located in a monitored zone and directed in a beam at the sensor back through the optical system to indicate the location of a monitored zone provided by the optical system structure.

In preferred embodiments, the sensor is of the pyroelectric type; the diffuse reflector is a sheeting member that has a primary color and is removably mounted immediately in front of the sensor for installation assistance purposes; and diffuse reflector support structure includes interlock structure that cooperates with the housing structure to provide an indication that the reflector is positioned in front of the sensor in an obstructing position.

In a particular embodiment, the diffuse reflector of red fluorescent material has an area of less than 0.5 square centimeter, is permanently affixed to a support member and is movable between a sensor obstructing position and a sensor non-obstructing position. In the sensor obstructing position, interlock structure prevents closure of the housing. In another embodiment, the diffuse reflector is fixed on a removable mask member that includes interlock structure.

In installation of the intrusion detection system, the installer mounts the detector on a wall or other appropriate structure and positions the diffuse reflector over the sensor and substantially at the focal point of the single or multifacet optical system. The installer then locates a focused light source in one detection zone so that its beam of light illuminates the optical system, as evidenced by the glow from the reflector. In that condition, the installer can then walk into other zones and, when in any such zone, will see the beam of light reflected by the diffuse reflector and the optical system. Thus, when the installer is in any of the monitoring zones remote from the detector housing, the reflected beam of light furnishes the installer with a distinct indication of the boundaries of that monitoring zone. The installer may shift the housing, as appropriate, to locate the several monitoring zones in desired locations clear of obstructions and free of disturbances from heat sources and the like. After the detection unit has been satisfactorily located, the diffuse reflector, if of the obstructing type, is shifted to a non-obstructing position.

Other features and advantages of the invention will be seen as the following description of particular embodiments progresses, in conjunction with the drawings, in which:

FIG. 1 is a perspective view of an intrusion detector in accordance with the invention;

FIG. 2 is a sectional diagrammatic view of the intrusion detector shown in FIG. 1;

FIG. 3 is a front view of the multifacet mirror employed in the intrusion detector shown in FIG. 1;

Figure 6:
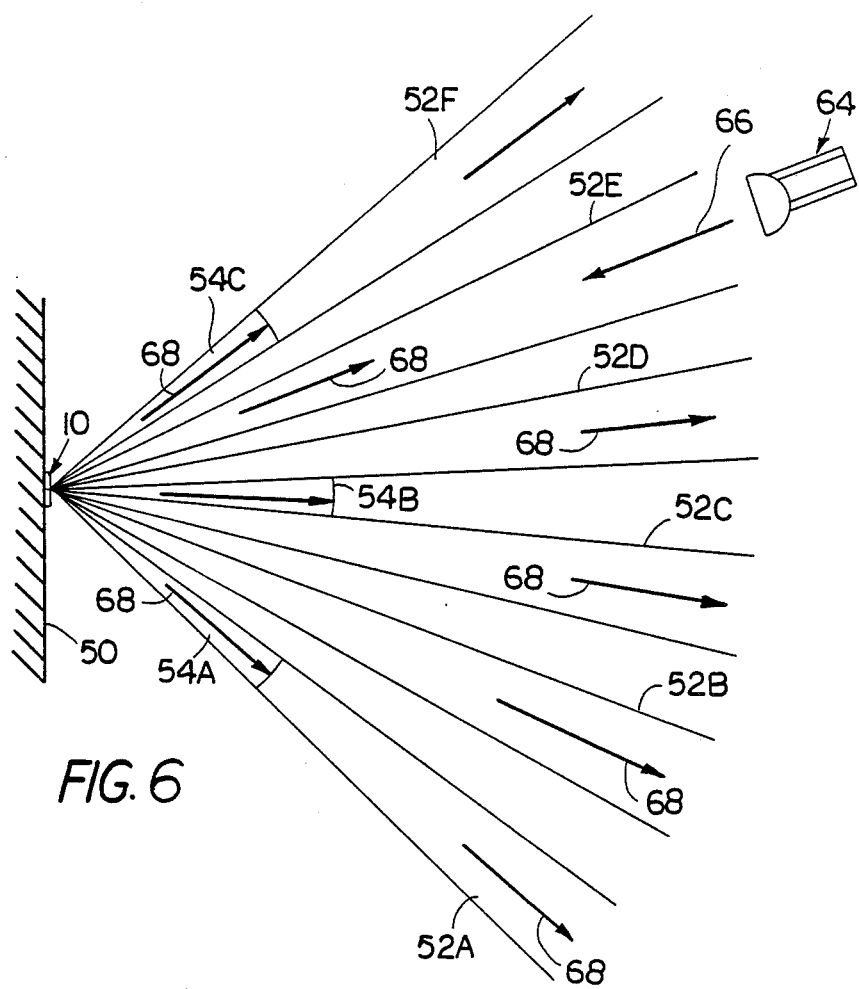
Figure 7:
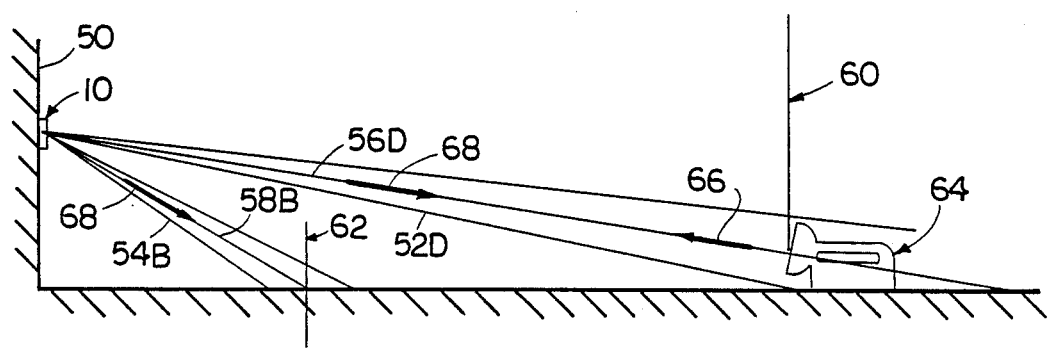
Figure 8:
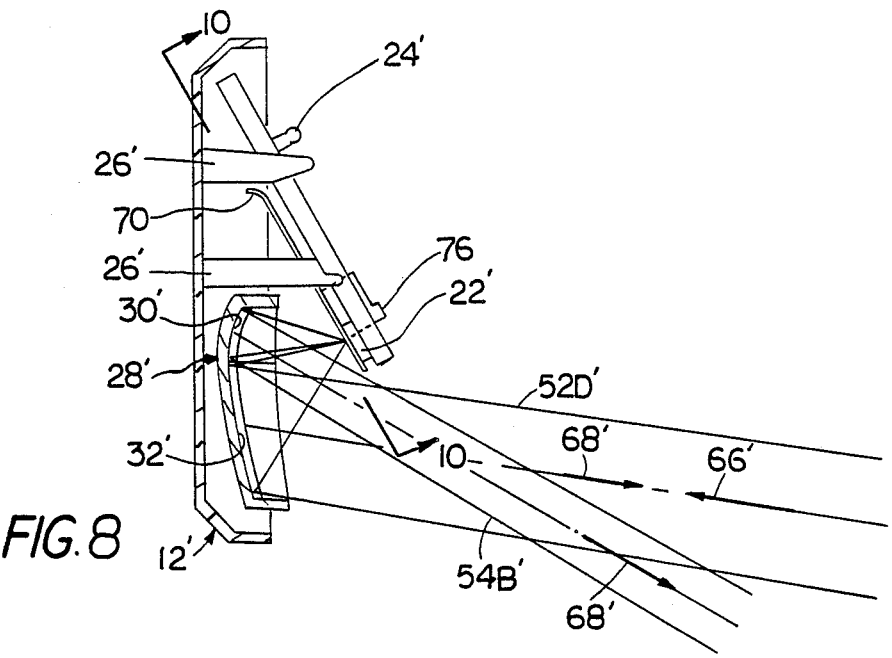
Figure 9:
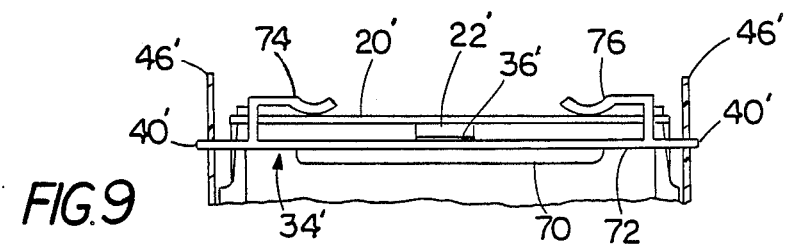
Figure 10:
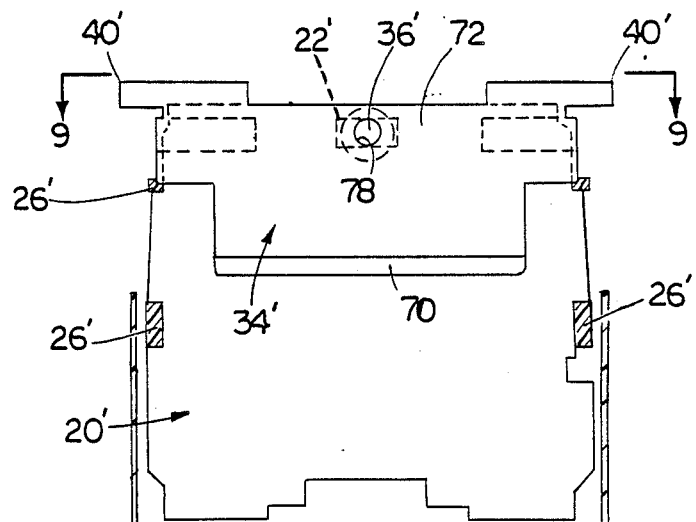

FIGS. 4 and 5 are elevational views taken along the lines 4—4 and 5—5 of FIG. 2 of the sensor support board and reflector support structure employed in the detector shown in FIG. 1;

FIG. 6 is a top view diagram indicating monitoring zones and installation procedure provided by the detector shown in FIG. 1;

FIG. 7 is a side view diagram of monitoring zones and installation procedure provided by the detector shown in FIG. 1; and FIGS. 8, 9 and 10 are views similar to FIGS. 2, 4 and 5 of an alternate form of reflector support structure in accordance with the invention.

DESCRIPTION OF PARTICULAR EMBODIMENTS

The intrusion detector shown in FIG. 1 includes housing 10 with base member 12 and cover member 14. Housing 10 is about eight centimeters wide, nine centimeters long and four centimeters deep, and cover member 14 includes window region 16 that has a height of about 2½ centimeters and a width of about three centimeters and indicator aperture 18 that has a width of about one centimeter and a height of about one-third centimeter.

Mounted within housing 10 is sensor support structure 20 in the form of a printed circuit board in this embodiment on which pyroelectric sensing element 22 and indicator 24 are mounted. Support 20 is secured on supports 26 and includes circuitry for processing signals from sensing element 22 and producing an output signal or alarm in response to changes in the level of infrared energy impinging on sensor 22, as occurs when a warm-bodied object moves into or out of one of the monitoring zones of the detector. Also mounted within housing 10 is stationary mirror element 28 that, as may be seen with reference to FIG. 3, has a series of three facets 30A-30C in its upper portion, a series of six facets 32A-32F in its lower portion, and each facet 30, 32 focusing radiation from an associated monitored zone onto sensor 22.

Diagrammatic views of the sensor support board 20 are shown in FIGS. 4 and 5. Disposed on support 20 is mask structure 34 on which diffuse reflector 36 (a piece of red-orange vinyl fluorescent film (Scotchcal TM 3484) that has an area of about one-sixth square centimeter) is adhered adjacent aperture 38. Interlock portion 40 projects from one end of mask 34. Mask structure 34 is secured to support board 20 by fastening posts 42 that are disposed in elongated slots 44 so that mask 34 may be moved between the position (as shown in FIGS. 4 and 5) in which aperture 38 is aligned with the sensing area of sensor 22 and a shifted position (shown in dotted lines in FIGS. 4 and 5) in which diffuse reflector 36 is disposed immediately over and obstructs sensor 22 and interlock portion 40 extends over the perimeter wall region 46 of housing 10. In alternate embodiments, diffuse reflector 36 may be applied as an, e.g. Day-Glo, fluorescent coating composition to a substrate behind an aperture in mask 34, applied directly to the face of sensor 22 and removed after the installation process is complete, or if the diffuse reflector is fabricated of a material which is transparent to infrared energy but reflective of visible light (such as a diffuse reflector coating for the face of sensor 22 which transmits infrared energy), the reflector can be left in front of sensor 22 when the system is in use.

The detection system unit is mounted on an appropriate support surface such as wall 50 as indicated in FIGS. 6 and 7, and provides six monitoring zones 52A-52F from mirror facets 32A-32F and three monitoring zones 54A-54C from mirror facets 30A-30C. Each monitoring zone 52, as indicated in FIG. 6, has an angular width of about 8°, its central ray 56 is inclined at an angle of about 9°, and zones 52 are spaced about 15° apart on center lines. Each monitoring zone 54 has an angular width of about 8°; fields 54A and 54C are each angularly spaced about 38° from field 54B; and each central ray 58 that is inclined downwardly at an angle of about 30°, as indicated in FIGS. 2 and 7. Detection regions 60 are located about thirty-five feet from wall 50 on which housing 10 is mounted at a height of about seven feet; and detection regions 62 are located about twelve feet from wall 50.

In installation of the system, the installer mounts housing 10 on wall 50, removes cover 14 and positions diffuse reflector 36 directly in front of and substantially at the focal point of the optical system provided by mirror facets 30, 32. In that position, housing cover 14 cannot be closed as interlock 40 obstructs it. The installer then locates a focused light source such as lantern 64 in one detection region (60E in FIG. 6) so that its beam 66 of light illuminates mirror 28 and the red beam 68E of light reflected by reflector 36 indicates the boundaries of zone 52E. In this condition, the installer can then walk into other regions 60, 62 and, when in any such region, will see the corresponding red beam 68 of light reflected by mirror 28 and diffuse reflector 36. Thus, the installer, when in any of the detection regions 60, 62 remote from the detector housing 10, is furnished a distinct indication of the boundaries of the detection region by the reflected beam of red light. The installer may shift the housing 10 on wall 50, as appropriate, to locate the several detection regions 60, 62 in desired locations clear of obstructions and free of disturbances from heat sources and the like. (Should a retroreflective-type of diffuse reflector be used, the installer must locate the light source in each zone he desires to check).

After the detection unit 10 has been satisfactorily located, the mask structure carrying reflector 36 is shifted to the position shown in FIG. 5 so that aperture 38 is aligned with sensor 22 and interlock projection 40 is retracted into the housing so that cover 14 may be secured on housing base 12.

In an alternate embodiment, shown in FIGS. 8-10, mask structure 34' is of 0.5 millimeter thick phospher bronze that has been painted flat black and includes apron 70, body portion 72 with aperture 78 behind which red diffuse reflector 36' is adhesively secured, securing tabs 74, 76, and interlock projections 40'. As indicated in FIGS. 8-10, mask 34' is resiliently and removably positioned on sensor support 20' by spring clips 74, 76 such that interlock projections 40' extend outwardly and block the seating of cover 14' on base 12'. In this position, diffuse reflector 36' (of about four millimeters diameter) is aligned with and immediately in front of sensor 22', and the installer may locate light source 64' so that beam 66' illuminates mirror 28' and reflector 36' reflects beams 68 of red light so that the installer, when positioned in any one of the several monitoring zones 52', 54', can identify the boundries of that zone at appropriate distances from housing 10'. After housing 10' has been satisfactorily located, mask structure 34' is removed from sensor support board 20' and cover 14' is secured on base 12'.

While particular embodiments of the invention have been shown and described, other embodiments will be apparent to those skilled in the art, and therefore it is not intended that the invention be limited to particular embodiments or to details thereof, and departures may be made therefrom within the spirit and scope of the invention.

What is claimed is:
1. An intrusion detection system comprising
   housing structure including structure defining a radiation entrance aperture,
   a sensor responsive to infrared radiation mounted in said housing structure, optical system structure in said housing structure for receiving infrared radiation through said radiation, entrance aperture defining structure from a monitored zone and focusing said received infrared radiation onto said sensor, means in said housing structure connected to said sensor for providing an output signal in response to movement of an infrared radiating object in said monitored zone, and diffuse reflector structure adapted to be located in a first position immediately in front of said sensor for reflecting visible radiation from a source of visible radiation located in said monitored zone in a beam directed back through said optical system to said monitored zone provided by said optical system structure.

2. The system of claim 1 wherein said sensor is of the pyroelectric type.

3. The system of claim 1 wherein said optical system is of the multifacet type for receiving radiation from a plurality of monitored zones.

4. The system of claim 1 wherein said diffuse reflector is removably mounted immediately in front of said sensor.

5. The system of claim 1 and further including interlock structure that cooperates with said housing structure to provide an indication when said reflector structure is positioned in front of said sensor in an obstructing position.

6. The system of claim 5 wherein said interlock structure prevents closure of said housing structure.

7. The system of claim 1 wherein said diffuse reflector is of fluorescent material.

8. The system of claim 1 wherein said diffuse reflector has a primary color, preferably red.

9. The system of claim 1 wherein said sensor is mounted on a support member in said housing structure, said diffuse reflector is permanently affixed to said support member, said support member has an aperture of area of about one-half square centimeter, and said diffuse reflector is mounted behind said aperture.

10. The system of claim 1 wherein the area of said diffuse reflector is less than one-half square centimeter.

11. The system of claim 1 wherein said sensor is mounted on a support member in said housing structure, and said diffuse reflector is permanently affixed to said support member.

12. The system of claim 11 wherein said diffuse reflector structure is movable between said first position in front of said sensor and a second position offset from said first position.

13. The system of claim 12 and further including interlock structure that cooperates with said housing structure to provide an indication when said reflector structure is positioned in front of said sensor in an obstructing position.

14. The system of claim 13 wherein said diffuse reflector is of fluorescent sheeting.

15. The system of claim 13 wherein said optical system is of the multifacet type for receiving radiation from a plurality of monitored zones.

16. The system of claim 10 wherein said sensor is of the pyroelectric type.

17. The system of claim 16 wherein said diffuse reflector has a primary color.

18. The system of claim 16 wherein said sensor is mounted on a support member in said housing structure, said diffuse reflector is permanently affixed to said support member, said support member has an aperture of area of about one-half square centimeter, and said diffuse reflector is mounted behind said aperture.

19. The system of claim 16 wherein said diffuse reflector structure is movable between said first position in front of said sensor and a second position offset from said first position.

20. The system of claim 16 wherein said diffuse reflector is removably mounted immediately in front of said sensor, said diffuse reflector has a primary color, and further including interlock structure that cooperates with said housing structure to provide an indication when said diffuse reflector structure is positioned in front of said sensor in an obstructing position.

* * * * *